(12) United States Patent
Acker et al.

(10) Patent No.: US 7,102,118 B2
(45) Date of Patent: Sep. 5, 2006

(54) BEAM FORMATION UNIT COMPRISING TWO AXICON LENSES, AND DEVICE COMPRISING ONE SUCH BEAM FORMATION UNIT FOR INTRODUCING RADIATION ENERGY INTO A WORKPIECE CONSISTING OF A WEAKLY-ABSORBENT MATERIAL

(75) Inventors: Stefan Acker, Waldeck (DE); Juergen Weisser, Jena (DE); Gisbert Staupendahl, Kunitz (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 0 days.

(21) Appl. No.: 10/526,039

(22) PCT Filed: Aug. 25, 2003

(86) PCT No.: PCT/DE03/02853

§ 371 (c)(1),
(2), (4) Date: Feb. 28, 2005

(87) PCT Pub. No.: WO2004/020141

PCT Pub. Date: Mar. 11, 2004

(65) Prior Publication Data

US 2006/0091283 A1 May 4, 2006

(30) Foreign Application Priority Data

Aug. 28, 2002 (DE) .............................. 102 40 033

(51) Int. Cl.
*B23K 26/00* (2006.01)

(52) U.S. Cl. .................... 250/216; 219/121.63

(58) Field of Classification Search ............ 250/201.3, 250/216; 347/244; 219/121.63, 121.67, 219/121.68, 121.69, 121.7, 121.72, 121.75, 219/121.77; 356/618, 739, 740
See application file for complete search history.

(56) References Cited

U.S. PATENT DOCUMENTS

| 3,419,321 A | 12/1968 | Barber et al. |
| 4,275,288 A | 6/1981 | Makosch et al. |
| 4,456,811 A | 6/1984 | Hella et al. |
| 4,623,776 A | 11/1986 | Buchroeder et al. |
| 5,256,853 A | 10/1993 | McIntyre |
| 5,796,112 A * | 8/1998 | Ichie ........................ 250/458.1 |
| 6,004,487 A | 12/1999 | Wada et al. |
| 2001/0028385 A1 | 10/2001 | Hayashi |

FOREIGN PATENT DOCUMENTS

DE 28 21 883 10/1979

(Continued)

*Primary Examiner*—Stephone B. Allen
(74) *Attorney, Agent, or Firm*—Reed Smith LLP (57) ABSTRACT

The invention is directed to a beam-shaping unit for generating a beam bundle which is focused in a punctiform manner, propagates in a ring shape, and has a radiationless central area, comprising a focusing lens, a first axicon and a second axicon, and to an arrangement with a beam-shaping unit of this kind for introducing radiation energy into a workpiece comprising weakly absorbent material which is arranged between a first resonator mirror and a second resonator mirror. The first resonator mirror which is arranged in front of the workpiece in the radiating direction is located in the radiationless central area. The radiation energy can be absorbed to the maximum extent by repeatedly passing through the same interaction volume in the workpiece.

6 Claims, 8 Drawing Sheets

FOREIGN PATENT DOCUMENTS

| | | |
|---|---|---|
| DE | 195 03 675 | 8/1995 |
| EP | 0 189 027 | 7/1986 |
| FR | 2 641 968 | 7/1990 |
| GB | 1 405 487 | 9/1975 |
| GB | 2 139 614 | 11/1984 |
| GB | 2228099 A * | 8/1990 |
| JP | 10 244 386 | 9/1998 |
| WO | WO 02/48059 | 6/2002 |

* cited by examiner

BEAM FORMATION UNIT COMPRISING TWO AXICON LENSES, AND DEVICE COMPRISING ONE SUCH BEAM FORMATION UNIT FOR INTRODUCING RADIATION ENERGY INTO A WORKPIECE CONSISTING OF A WEAKLY-ABSORBENT MATERIAL

CROSS-REFERENCE TO RELATED APPLICATIONS

This application claims priority of International Application No. PCT/DE2003/002853, filed Aug. 25, 2003, and German Application No. 102 40 033.4, filed Aug. 28, 2002, the complete disclosures of which are hereby incorporated by reference.

FIELD OF THE INVENTION

The invention is directed to a beam-shaping unit of the generic type known to the person skilled in the art for focusing a beam bundle and to an arrangement of the generic type known from JP 10 244 386 A.

DESCRIPTION OF THE RELATED ART

The introduction of high-output electromagnetic radiation into a workpiece comprising a material which is only weakly absorbent continues to be a central problem in materials processing. In this connection, laser materials processing in particular assumes a central role in corresponding developments, since there is a series of suitable radiation sources available with characteristics that can be efficiently adapted to a broad range of applications.

Often, it is not sufficient simply to focus the beam on the surface of the workpiece in order to make truly effective use of the available energy, i.e., to introduce this energy into the workpiece in an optimal manner spatially and quantitatively. Accordingly, a large number of methods and arrangements have been developed to introduce energy in an optimal manner adapted to the specific machining tasks. These methods and arrangements aim at shaping and guiding the beam in different ways depending substantially on the various machining tasks (e.g., severing, ablating or perforating) and the different geometry and material of the workpiece to be machined.

Of the many solutions in the prior art, only those which either shape the beam bundle to form a beam ring and/or guide the beam repeatedly through the workpiece are considered relevant to the invention.

In the solutions known from the prior art, a beam ring is formed exclusively for the purpose of a circle-shaped irradiation of a workpiece surface, e.g., in order to cut out a lens. Ideally, the beam is focused in the shape of a ring on the workpiece surface. It is known to use an axicon to transform the beam bundle into a beam ring.

For example, in U.S. Pat. No. 4,456,811 (or EP 0 189 027 A1), the laser beam is shaped into a focused ring by a combined collecting lens/axicon and a conical mirror in such a way that a curved, rotationally-symmetric workpiece surface is impinged perpendicularly by this focus ring and is efficiently machined.

U.S. Pat. No. 4,623,776 describes a very similar arrangement in which plastic lenses, for instance, can be cut out in an optimal manner by means of the generated focused beam ring.

The basic aim of the axicon/focusing lens combination, namely, to generate a plane, focused beam ring, is addressed in patents DE PS 28 21 883 (U.S. Pat. No. 4,275,288) and U.S. Pat. No. 3,419,321, wherein the generated beam ring is used, for example, to cut out holes with a defined diameter, to weld contours of this kind, or the like operations in laser materials processing.

The only thing that the solutions mentioned above have in common with the subject matter of the present invention is that a beam bundle is shaped by means of an axicon.

More relevant in terms of objective are those solutions in which steps are taken to guide the beam bundle through the workpiece repeatedly in order to increase the energy input, so that materials that are highly transmissive but only weakly absorbent can also be machined.

For example, GB 2 139 614 A describes an arrangement whose main objective is, on the one hand, to shape the laser beam focused on the workpiece in a specific manner so that a stress crack is formed in a defined manner when cutting glass and, on the other hand, to achieve a second focused pass through the same interaction volume in the workpiece by means of a second focusing mirror arranged on the back of the workpiece. The amount of radiation energy absorbed is increased by the double passage of the laser beam through the workpiece.

JP Patent No. 10 244 386 A, published in Patent Abstracts of Japan, likewise shows a method for severing workpieces by generating a thermal stress crack. The laser beam is transmitted by the workpiece at least twice simultaneously or successively in time along the severing zone substantially at the same location or at locations at a slight distance from one another. The laser beam passes through a semitransparent mirror before striking the workpiece. The transmitting beam component passes through the workpiece, is reflected back into the workpiece by a mirror arranged underneath the workpiece and again strikes the semitransparent mirror, which reflects a portion of the beam back to the workpiece. In this way the beam passes repeatedly through the workpiece which is arranged between this mirror and a second mirror. However, the energy loss is extreme. The beam components that are reflected by the semitransparent mirror when the beam first impinges and the beam components that are transmitted when impinging again on the semitransparent mirror are wasted in terms of machining the workpiece in the first place and are reflected back into the radiation source in the second place.

There is no solution known from the prior art by which the available radiation energy can be absorbed nearly completely in a small interaction volume of a partially transparent workpiece. This fact is explained particularly in that an optical element which reflects the beam back into the interaction volume at least twice for this purpose is always in the optical beam path between the radiation source and the workpiece. Since there is no optical element, including optical films, which completely transmits an unchanged beam in one passage direction and reflects it completely in the other passage direction, energy loss is inevitable. It is clear to the person skilled in the art that practically any optical element located in a beam path will always result in losses, even if these losses are minor. There is a high loss whenever the element is at times reflective and at times transmissive for radiation coming from different directions as, for example, in a semitransparent mirror or a splitter cube.

OBJECT AND SUMMARY OF THE INVENTION

It is the primary object of the invention to provide a beam-shaping unit which shapes a ring-shaped beam bundle that can be focused in a punctiform manner and that has a radiationless central area in which there can be arranged an optical element that will not be affected by a beam bundle coming from a radiation source and penetrating the beam-shaping unit and which therefore does not cause losses.

It is a further object of the invention to provide an arrangement by which, through the use of a beam-shaping unit that meets the object of the invention, relatively weakly absorbent, extensively transparent materials can be machined by electromagnetic radiation, preferably the radiation of a high-power laser, in such a way that ultimately the total absorption in the material is high and, therefore, the radiation energy is made use of efficiently for the machining process through multiplication of the individual absorbencies, and it is ensured that the radiation energy is introduced into the smallest possible interaction volume (volume of the workpiece over which the radiation is absorbed) in order to achieve high-precision machining, and radiation that is not absorbed is substantially prevented from being coupled back into the radiation source.

The object, according to the invention, is met for a beam-shaping unit for generating a ring-shaped beam bundle with a focusing lens followed by a first axicon which is arranged with the focusing lens on a common optical axis and whose conical optical surfaces faces the focusing lens and in that a second axicon is arranged on the optical axis in front of the focusing lens with its conical optical surface remote of the focusing lens and the parameters of the focusing lens and of the axicons and their distance from one another are selected in such a way that a beam bundle coming from a radiation source arranged on the optical axis in front of the second axicon and passing through the beam-shaping unit is shaped into a ring-shaped beam bundle which is focused in a first focus point and which subsequently diverges and which has a central area in which radiation is absent.

The object, according to the invention, is further met for an arrangement for introducing radiation energy into a workpiece comprising a weakly absorbent material, with a radiation source and a resonator unit, comprising a first resonator mirror and a second resonator mirror between which the workpiece is fixed and in that a beam-shaping unit, as discussed immediately above, is arranged in front of the resonator unit and the first resonator mirror is located in the radiationless central area behind the first focus point, in that there is a collecting lens which surrounds the first resonator mirror and which focuses the incident beam bundle in the workpiece in a second focus point, in that the second resonator mirror is located in a radiationless central area behind the second focus point and surrounded by a focusing mirror which shapes the divergent beam bundle coming from the second focus point into a convergent beam bundle and reflects it onto a mirror that is arranged between the focusing mirror and the workpiece and reflects the beam bundle on to the second resonator mirror, in that the mirror has a hole that is just large enough to allow the beam bundle coming from the second focus point and traveling in the direction of the focusing mirror to pass through without being influenced and through which the beam bundle reflected by the second resonator mirror passes without being influenced and is focused a second time inside the workpiece in a second focus point before subsequently striking the first resonator mirror and being reflected back by the latter into the workpiece.

Advantageous embodiment forms are described in the subclaims.

Since the nature of the beam-shaping unit according to the invention predominantly determines the nature of the arrangement according to the invention, the nature of the invention will be described in the following with reference to the arrangement.

It is clear to the person skilled in the art that an optical beam can pass through a medium (workpiece) repeatedly on the same optical path (in order to introduce radiation energy into a small interaction volume) only when a reflector is arranged on both sides of the medium, that is, it is mandatory that a first reflector is arranged in front of the workpiece in the radiating direction. This first reflector has no function for the first coupling in of the beam into the workpiece and should therefore allow the beam to pass as far as possible without being influenced. It should reflect the impinging radiation as completely as possible only after the beam impinges on the first reflector again after being reflected at the second reflector and after passing through the workpiece a second time.

Herein lies the fundamental idea of the invention: in order for the first reflector not to influence the beam practically at all before it first strikes the workpiece, the beam bundle should be shaped in such a way that it does not pass through the first reflector, even though the latter is located in the beam path, but surrounds it instead. This beam shaping is realized by a beam-shaping unit according to the invention. It is substantial to the invention that this beam-shaping unit shapes the beam bundle coming from the radiation source in such a way that the entire beam is collected in a first focus point in the radiating direction behind this beam-shaping unit and subsequently diverges in such a way that it propagates as a ring with a defined radiationless central area whose diameter increases linearly with the distance from the first focus point. A first resonator mirror belonging to a resonator unit arranged downstream of the beam-shaping unit is arranged in this radiationless central area. The resonator unit shapes and guides the beam defined by the described propagation characteristics in such a way that the first focus point is imaged in the workpiece in a second focus point and the radiation energy is accordingly concentrated in a punctiform manner in a small interaction volume that is penetrated repeatedly, but at least four times, by the beam, and the sum of the radiation absorbed by the workpiece is increased in this way to a corresponding multiple of the individual absorption.

In order to collect the beam in a first focus point and subsequently expand it such that a beam ring occurs, it is not sufficient to work with a focusing lens and only one axicon as is usual in solutions known from the prior art which generate a focus ring on the workpiece surface in a uniform manner. These solutions are characterized in that the intersection of the central rays of the ring generated by the axicon and the focus point of the individual beam segments of this ring are displaced relative to one another considered in the beam propagating direction. When the parameters of the focusing lens, the axicon parameters and their relative spacing are adapted to one another in such a way that all rays meet at one point, the effect is ultimately that of an adequate individual lens, i.e., the rays proceeding from this point do not form a ring with a central radiationless hole that increases in size in proportion to the distance from the focus. This problem can be solved, according to the invention, by introducing a second axicon into the beam path. The combined effect of these three components (two axicons plus focusing lens) is the following: the first axicon provides for the desired shaping of the ring. The focusing lens causes the rays to be collected in the known ring focus which degenerates into the required first focus point when a suitable convergence supplied by the second axicon is superimposed. This first focus point is now actually the starting point of a beam propagating in a ring-shaped manner with a center entirely free of radiation. This special beam shaping makes it possible to realize the actual goal of the arrangement by means of the resonator unit according to the invention. That is, since all beam components proceed from one point, namely, the first focus point, behind the beam-shaping unit, they can always be "refocused" again, i.e., collected in another focus point, by the collecting lenses or concave mirrors arranged downstream, and the ring shape is maintained on the beam path between the focus points. This is the precondition that must be met in order for the resonator unit arranged downstream to fulfill its function. The resonator unit is constructed substantially as follows: The input element of the resonator unit is a collecting lens whose distance from the first focus point is selected in such a way that the radiationless central area of the beam bundle is large enough for a concave mirror functioning as a first resonator mirror to be arranged therein without masking portions of the beam bundle. The beam bundle is accordingly guided entirely through this collecting lens when entering the resonator unit without being influenced by the first resonator mirror. The first collecting lens focuses the beam in the interaction volume of the workpiece to be machined, for example, a glass plate. A mirror with a central hole is arranged directly behind the workpiece which can have a thickness of several millimeters. This central hole must be large enough so that the beam bundle which diverges again behind the workpiece can pass through without losses. The beam bundle continues along the optical path to impinge on a focusing mirror which is arranged at a distance from the mirror with the central hole such that, on the one hand, there is again a sufficiently large radiationless central area on the focusing mirror which makes it possible to position another small concave mirror that functions as a second resonator mirror and, on the other hand, by means of a suitable selection of the radius of curvature of the focusing mirror, the beam bundle which, after being reflected at the focusing mirror, runs back in the direction of the mirror and converges again is completely reflected by the mirror and is collected in a third focus point located between the mirror and the second resonator mirror generally in the vicinity of the second resonator mirror. The beam bundle, now with a relatively small diameter, strikes the second resonator mirror whose radius of curvature is such that the beam is focused again, namely, in the interaction volume in the workpiece. The bundle which is already very narrow after being reflected at the second resonator mirror now penetrates the workpiece a second time and runs in the direction of the first resonator mirror. The radius of curvature of the first resonator mirror is adapted in such a way that a reflection is carried out anew, this time precisely in the third focus point. Therefore, the bundle strikes the second resonator mirror in such a way that the initial conditions of the "first resonator circuit" are reproduced, but with a reduced bundle diameter. In this way, the arrangement according to the invention works in a manner analogous to a resonator, i.e., the beam passes repeatedly through the interaction volume in the workpiece. The bundle "dies out" through absorption in the workpiece without the beam components returning to the radiation source.

The efficiency of the arrangement, i.e., the ratio of radiation energy deposited in the workpiece to the input energy supplied by the radiation source, is determined only by the inevitable principal losses, particularly the absorption at the optical elements, diffraction losses, and losses due to imaging errors and alignment errors and should be more than 50% also in relatively weakly absorbent materials (with an absorption of less than 10% per passage).

With respect to the beam configuration described above, it is taken into account that with every odd-numbered passage of the beam bundle through the workpiece following the first passage the beam bundle is not focused within the workpiece (second focus point) and therefore in the actual interaction volume, but rather in the vicinity of the workpiece (in the third focus point), since stable resonance behavior between the first resonator mirror and second resonator mirror can only be achieved in this way. However, this is not detrimental for the majority of applications, particularly also because the bundle diameter decreases from one passage to the next and is on the order of 1 mm or less in every case, given a suitable dimensioning of the optical parameters. For certain tasks, the beam components that are not sharply focused can even be very advantageous because they can have a temperature-regulating effect or can act to decrease the temperature gradient.

The geometry of the resonator unit can also be modified easily so that it is possible to adapt optimally to the workpiece characteristics, especially to the absorption behavior and the desired machining results. For example, the focal length of the first resonator mirror can be selected in such a way that the bundle coming from the second resonator mirror is focused in the interaction volume again, that is, practically returns into itself. After reflections at the second resonator mirror, the mirror and the focusing mirror, the workpiece is even penetrated a fourth time in a focused manner. When the absorption is not too low ($\geq 20\%$), the majority of the radiation energy is deposited in the zone to be machined. However, the residual radiation that is not absorbed in the interaction volume could then be coupled back into the radiation source if special steps are not taken. This problem can be solved relatively easily in that a beam decoupling unit that eliminates the returning light practically completely is placed in the beam path between the radiation source and the beam-shaping unit. However, for efficient operation of the beam decoupling unit, the radiation must come from the radiation source in a linearly polarized manner. The beam decoupling unit then functions as follows: first, the linearly polarized beam coming from the radiation source traverses a polarizer which is adjusted for full transmission, i.e., the beam bundle undergoes only minimal losses. The beam is then transformed into a circularly polarized beam by passing through a quarter-wave plate. This transformation is required, or at least useful, for numerous applications because the unwanted directional dependency of the results of machining disappears when circularly polarized radiation is used. The circular polarization is substantially maintained along the further beam path. The returning portion also has this characteristic. It now traverses the beam decoupling unit in the opposite direction with the result that the quarter-wave plate "further rotates" the polarization vector in such a way that linearly polarized light results again from the circularly polarized light, but with a polarization plane that is rotated by 90° relative to the radiated electromagnetic radiation field. However, the polarizer is now in the blocking direction for this radiation, i.e., the beam is prevented from being coupled back into the radiation source.

In the arrangement according to the invention, with any given optical parameters, the location with the most favorable ratios with respect to intensity, beam diameter and intensity distribution can generally be found and freely selected within relatively wide limits by displacing the workpiece along the optical axis. This is an important option, e.g., when severing glass by means of stress cracks. For this application in particular, it may be necessary to generate a starting crack. For this purpose, the invention offers the following three possibilities by way of example:

1. A radiation source is chosen which, in addition to continuous mode, enables a pulse mode with a highly exaggerated output peak (e.g., by means of a q-switching laser) in order to cause a deliberate, sensitive "destruction" of the material joint that starts the crack at the beginning of the machining process with a pulse of this type in the focus volume. The radiation source is then switched to normal operation and the starting crack is driven through the workpiece as a stress crack in the desired manner, i.e., with the aim of a defined severing process.

2. Since the arrangement according to the invention makes it possible to vary the relative position of the focus and workpiece quickly, it is also possible, for example, to proceed in such a way that the workpiece lies exactly in the focus as the machining of the workpiece commences (with continuously operating radiation source). With sufficient radiation output, the desired sensitive destruction of the material joint, i.e., the starting crack, can be produced. For further machining, in which melting and evaporation are not desirable, the workpiece is moved out of the focus area until optimal intensity conditions for severing by means of a stress crack are achieved.

3. A particularly flexible variant results when using an additional radiation source for generating the starting crack or for a series of such starting points with the aim of a precise contour even with complicated workpiece shapes. This additional radiation source should preferably be a pulsed laser. In an advantageous arrangement, a deflecting mirror which is transparent for the actual working beam (coming from the first collecting lens) but which reflects the beam of the second laser completely can be arranged, e.g., directly in front of the workpiece. The beam of the second laser is sharply focused on the workpiece by means of a 90-degree deflection at this deflecting mirror. The additional radiation source and the focusing optics for its beam are arranged laterally outside the main beam path. By means of suitable adjusting elements that can also be put into effect during the machining process, e.g., by means of actuating motors, it is possible to adjust a wide variety of desired relative positions between this sharp focus and the actual interaction volume. For example, the direction of the stress crack can be specifically influenced during the machining process.

When severing glass by means of Nd:YAG lasers or diode lasers, a small TEA-$CO_2$ laser, whose radiation is extensively absorbed by glasses, can be used as an additional radiation source. A pulse from a laser of this kind that is sharply focused on the surface of the glass sample is then sufficient for generating the desired starting crack.

Additional novel applications that are only mentioned herein but are not described in more detail are made possible by the arrangement according to the invention. For example, a nonlinear optical crystal can be arranged in the third focus point and used to generate higher harmonics of the original beam. High conversion rates are made possible as a result of the resonator arrangement and the relatively high intensity in this third focus point. In this way, the workpiece could be machined by the fundamental wave of the radiation as well as with a higher harmonic, which can lead to advantageous results.

The beam-shaping unit according to the invention has been described very thoroughly in connection with a resonator unit according to the invention, in which a first resonator mirror is located in the radiationless central area. Other optical elements can also be arranged in place of this first resonator mirror for other uses of the beam-shaping unit. For example, a deflecting mirror could be arranged at this location. This deflecting mirror need no longer be a semitransparent mirror; rather, the impinging beam can be reflected to the maximum extent by a highly reflective coating. In this way, a plurality of beam bundles can be superimposed without losses.

The invention will be described more fully in the following with reference to embodiment examples shown in the drawings.

DESCRIPTION OF THE PREFERRED EMBODIMENTS

An arrangement according to the invention substantially comprises a radiation source 6, a beam-shaping unit 4 and a resonator unit 5. The two axicons that are used in the beam-shaping unit 4 take on a central function. Therefore, to facilitate understanding of the invention, FIG. 1 first illustrates the basic function of an individual axicon 1 which is characterized by the cone angle $\delta$. The incident beam bundle, which is assumed to be slightly divergent and symmetric with respect to rotation, e.g., with a Gaussian or rectangular (top-hat) intensity cross section, impinges on the beam-shaping side (conical surface) of the first axicon 1 orthogonally and so as to be exactly centered. As a result of the refraction at its conical surface, the beam exits the first axicon 1 as a divergent ring. The central beams (shown as a dashed line) intersect at a point lying on the optical axis 9 (shown as a dash-dot line); the symmetry of the beam bundle with respect to rotation must always be taken into account.

Figure 1:
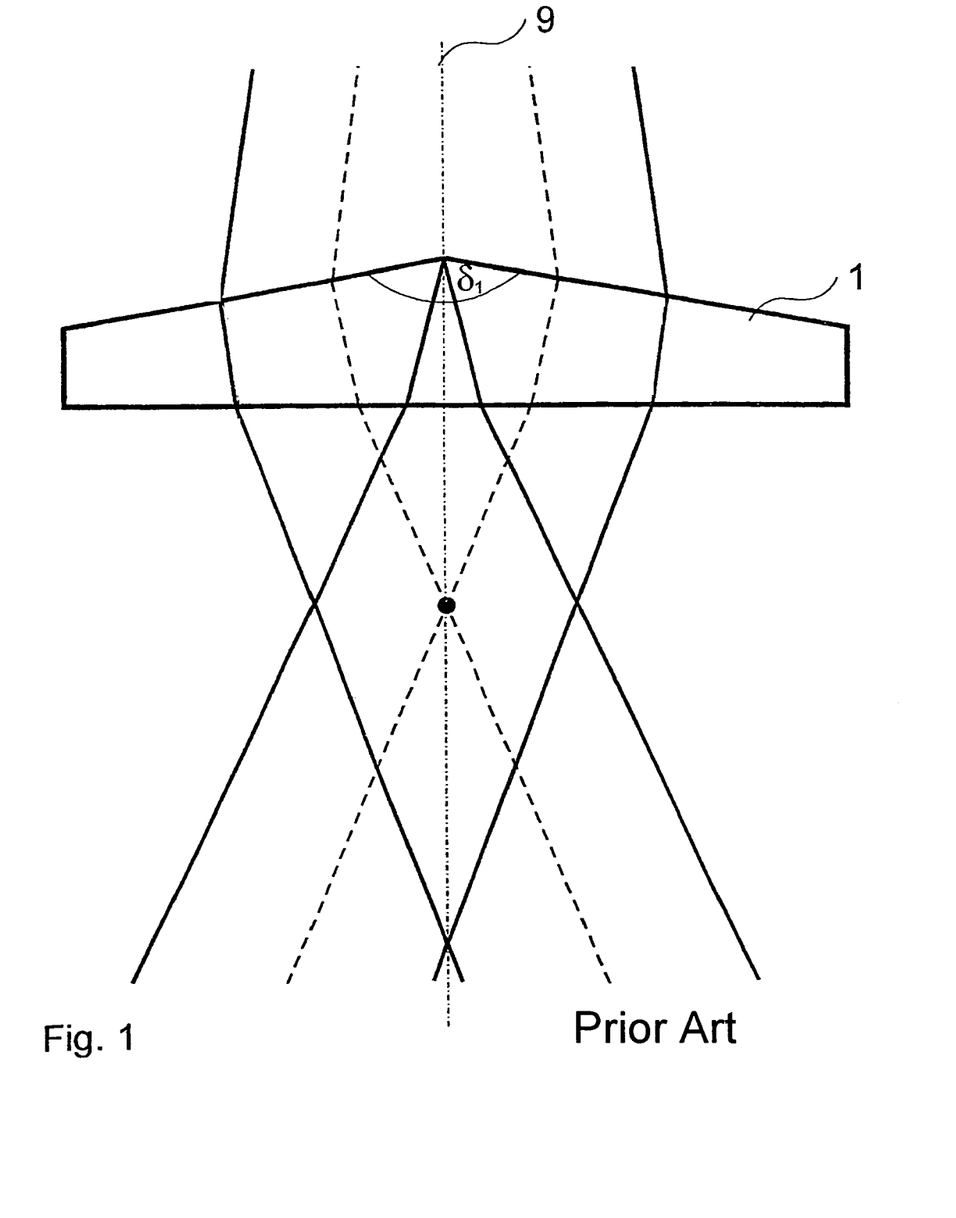
FIG. 1 shows a beam path through an axicon (prior art)
Figure 2:
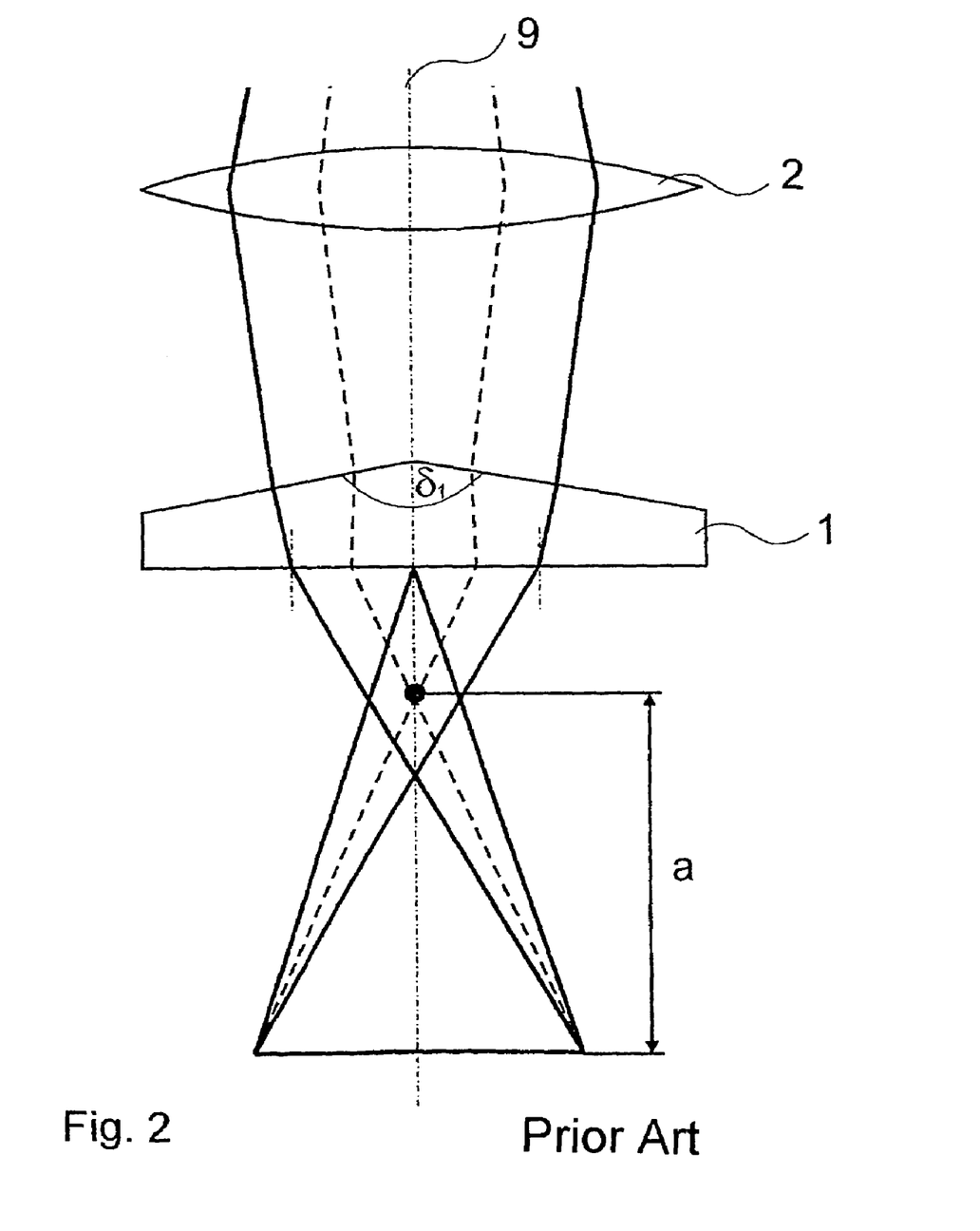
FIG. 2 shows a beam path through a collecting lens and an axicon (prior art)

FIG. 2 shows an arrangement for a typical use of a first axicon 1 known from the prior art, that is, for generating a ring focus. For this purpose, a focusing lens 2 which forms a convergent beam bundle from a beam bundle such as that shown striking the first axicon 1 in FIG. 1 is arranged in front of the first axicon 1. Due to the effect of the first axicon 1, which was already described with reference to FIG. 1, a convergent ring beam results after the beam passes through this first axicon 1. The central rays of this ring beam intersect again at a point on the optical axis 9 of the first axicon 1. A ring focus or focussed beam ring 10 results in a defined plane corresponding to the focal length of the focusing lens 2. Regardless of the parameters of the focusing lens 2 and those of the first axicon 1, the intersection of the central rays and of the ring focus are always at a distance a from one another.

Figure 3:
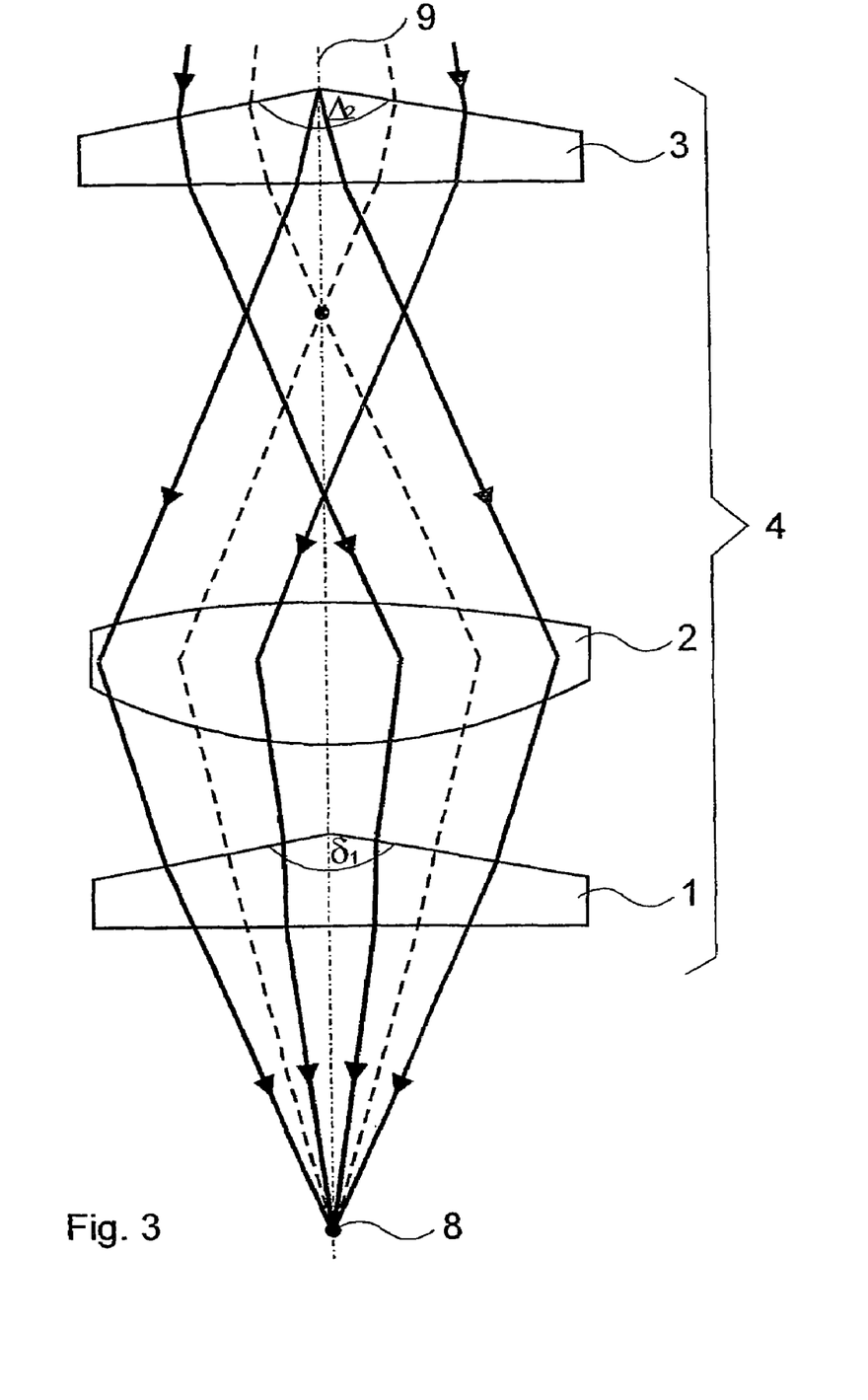
FIG. 3 shows a beam path through a beam-shaping unit comprising two axicons and a collecting lens.

However, it is necessary for the function of the arrangement according to the invention that a approaches zero, which only means that the focused beam ring 10 degenerates into a focus point that coincides with the intersection of the central rays. This first requirement, in connection with the second requirement that the beam reoccurs as a divergent ring with a radiationless central area after this focus point, can now be achieved by means of the inventive arrangement of a second axicon 3 in front as is shown in FIG. 3.

The first axicon 1, the focusing lens 2 and the second axicon 3 together form the beam-shaping unit 4 which is arranged on a common optical axis 9 with a resonator unit 5, described later on, and a radiation source 6 and determines the arrangement according to the invention. The overall arrangement is shown in FIG. 6, but is described with respect to its essential components, the beam-shaping unit 4 in FIG. 3 and the resonator unit 5 in FIG. 5.

The second axicon 3 with a cone angle $\delta_2$ ensures that the incident beam bundle, as was described in detail in FIG. 1, is initially pre-shaped in such a way that it already impinges on the focusing lens 2 in the shape of a ring so that the beam bundle which is convergent following the focusing lens 2 already impinges on the first axicon 1 in the shape of a ring with a radiationless central area and is finally interrupted by the effect of the latter in such a way that the entire convergent ring-shaped beam bundle is focused in a first focus point 8 at a defined distance behind the first axicon 1 and subsequently opens as a divergent beam ring 10 with an increasingly larger radiationless central area. The wedge angle $\delta_1$ of the first axicon 1 and $\delta_2$ of the second axicon 3 and their distances relative to one another and to the focusing lens 2 are brought into accord with the focal length of the focusing lens 2 in such a way that the desired beam path results.

Figure 4:
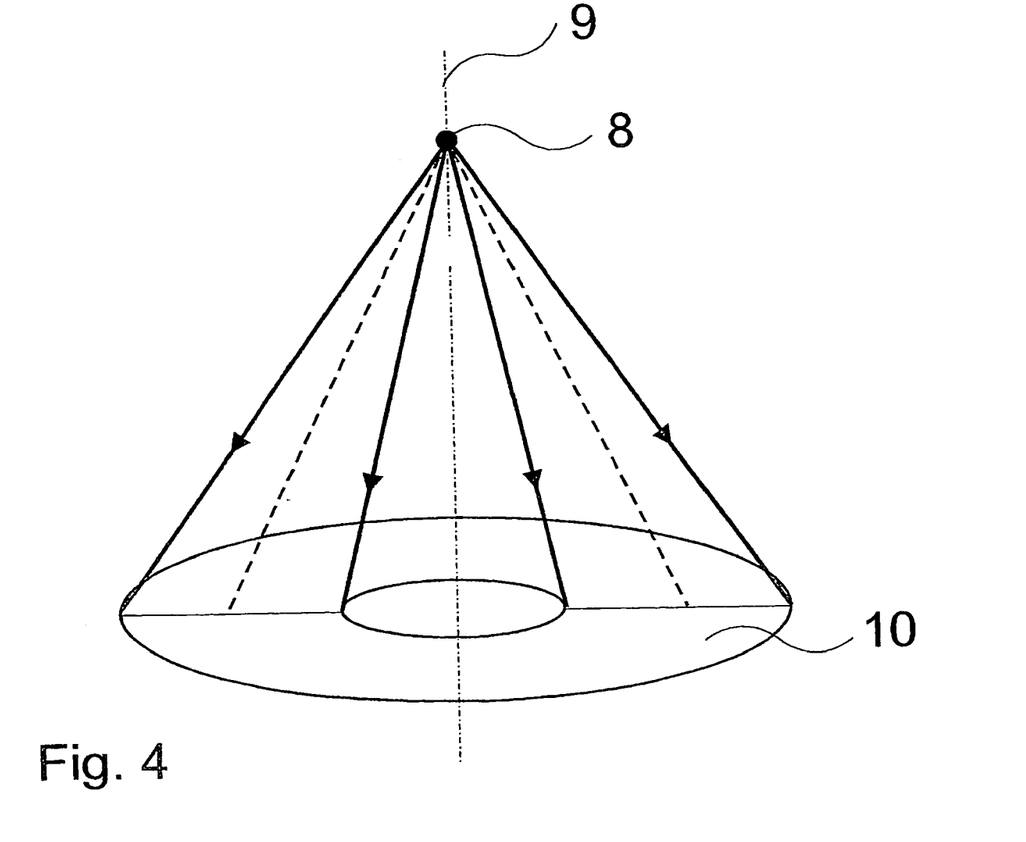
FIG. 4 shows the propagation of the beam cone behind a beam-shaping unit according to FIG. 3.

The propagation of the beam bundle after the common intersection of all rays in the first focus point 8 is shown once again in FIG. 4. As was already shown, the first focus point 8 is the starting point of a beam bundle which propagates in a ring-shaped manner with a divergence. In contrast to the drawings described above, in which the beam bundles are shown in longitudinal section through the optical system by central and marginal rays, FIG. 4 shows the ring-shaped beam bundle in cross section orthogonal to the optical axis 9. The beam bundle is shown in this cross section as a beam ring 10 with a radiationless central area.

Figure 5:
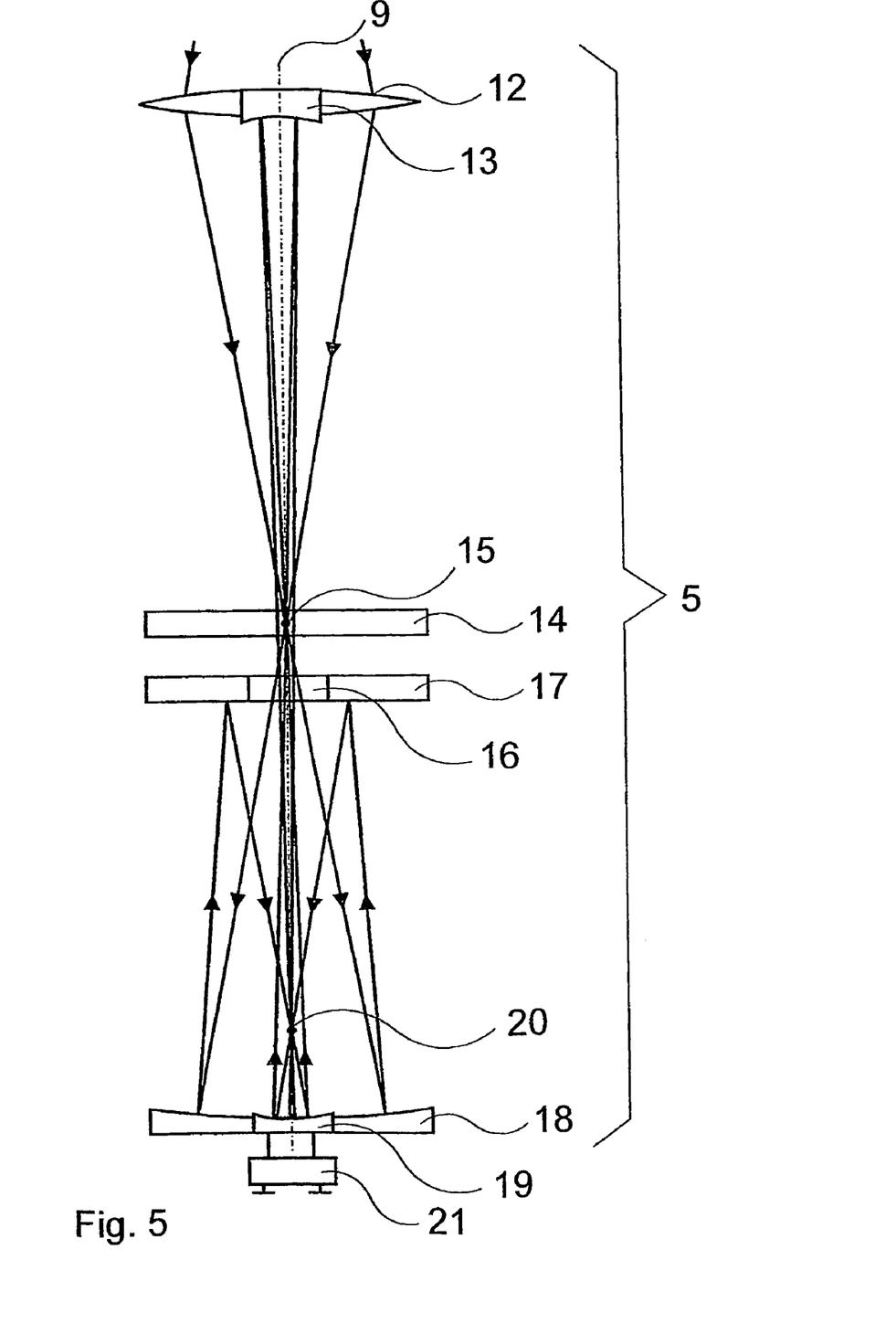
FIG. 5 shows a resonator unit and detailed beam path.
Figure 6:
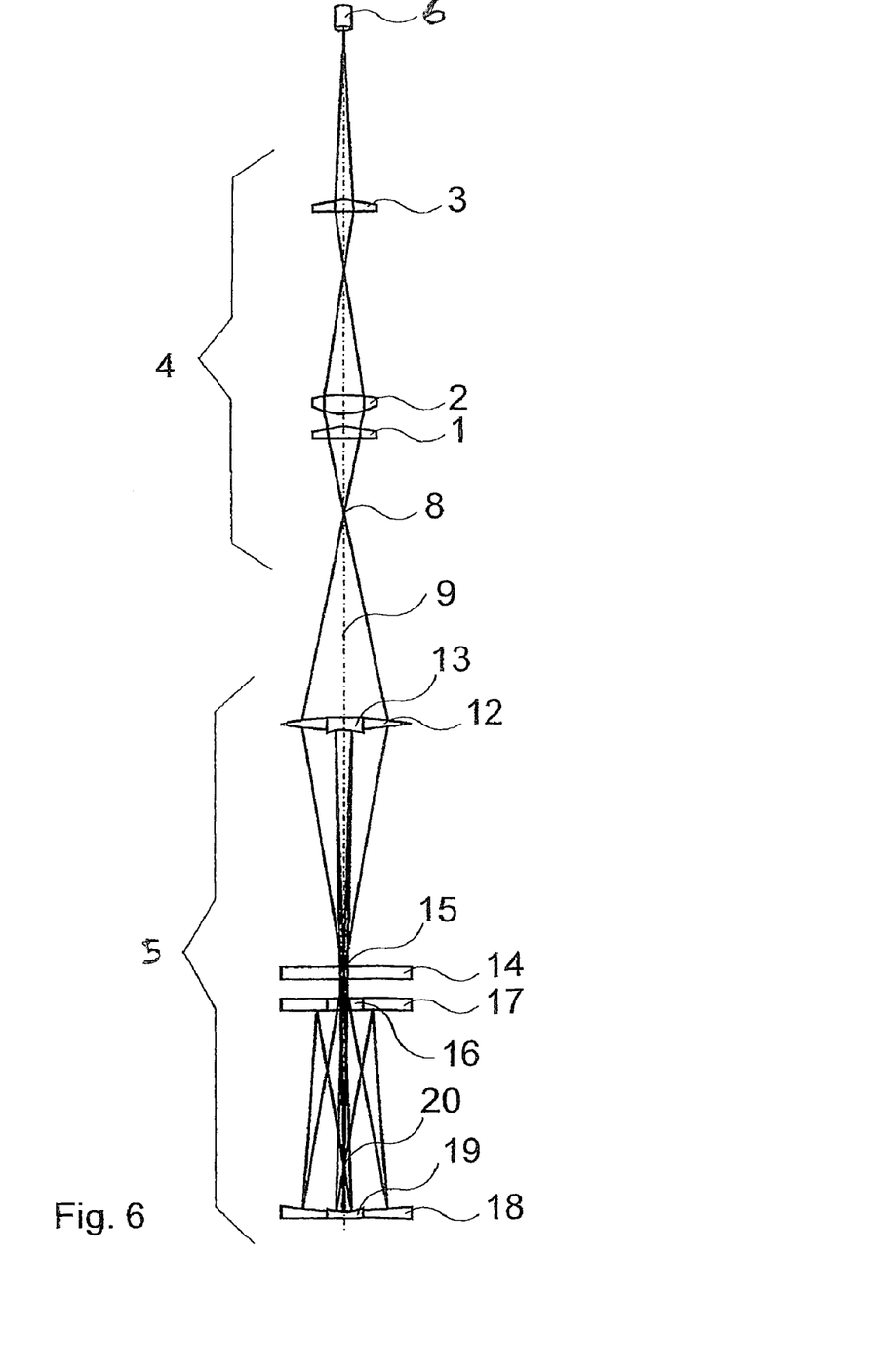
FIG. 6 shows an entire arrangement with radiation source, beam-shaping unit and resonator unit.

FIG. 5 shows the basic construction of the resonator unit 5 comprising a collecting lens 12, a first resonator 13, a mirror 17 with a hole 16, a focusing mirror 18 and a second resonator mirror 19. The arrangement of the elements relative to one another and the operation of the resonator unit 5 will be described.

The resonator unit 5 is arranged downstream of the beam-shaping unit 4 in the radiating direction in such a way that its first subassembly, comprising a collecting lens 12 and a first resonator mirror 13, is at a distance from the first focus point 8 such that the beam ring 10 lies completely on the collecting lens 12 and the first resonator mirror 13 lies completely in the radiationless central area. The collecting lens 12 and the first resonator mirror 13 need not necessarily lie in a plane (the person skilled in the art will understand that the principal planes are meant whenever it is stated that optically imaging elements lie in a plane). The collecting lens 12 focuses the ring-shaped beam bundle on the surface of a workpiece 14 and in the volume of a workpiece 14 (interaction volume) in the second focus point 15; the optimal position of the second focus point 15 relative to the workpiece 14 depends upon the task at hand. After this first passage through the workpiece and therefore after the first partial absorption, the beam bundle passes through a hole 16 in the mirror 17 which is precisely large enough to allow the beam bundle, which is now divergent again, to pass through without losses. In order to keep this hole 16 in the mirror 17 as small as possible, the mirror 17 is placed at a short distance behind the workpiece 14.

As it continues along its path, the beam bundle strikes the focusing mirror 18 which is located at a sufficient distance from the workpiece 14 behind the second focus point 15 so that a radiationless central area with a diameter of sufficient size to position the second resonator mirror 19 therein is also provided in this case. This second resonator mirror 19 can either be arranged so as to be stationary at the focusing mirror 18 or can be freely adjustable in order to ensure additional degrees of freedom of the arrangement with resect to adjustment. In the latter case, the focusing mirror 18 must have a sufficiently large opening so that the second resonator mirror 19 can, if needed, be tilted or also displaced along the optical axis 9 by means of an appropriate adjusting unit 21 which is arranged behind the focusing mirror 18, i.e., outside the entire beam path and, consequently, is not influenced by the latter. This enables a sensitive adjustment of the actual resonator which is formed by the first resonator mirror 13 and the second resonator mirror 19.

The continuing beam path following the reflection at the focusing mirror 18 makes clear the important function of the mirror 17. It paves the way for the function of the resonator insofar as it deflects the beam bundle, which now comes from the focusing mirror 18 so as to be divergent again, into the third focus point 20. It should be noted that the mirror 17 need not necessarily be a plane mirror as illustrated, but if necessary can also have an optically active curvature, e.g., when it is desirable to distribute the required collecting action unifying the radiation in the third focus point 20 approximately uniformly to the mirror 17 and to the focusing mirror 18. The third focus point 20 which is located at a relatively short distance in front of the second resonator mirror 19 plays a central role for the resonator. The focal length of the second resonator mirror 19 and its distance from the third focus point 20 are adapted to one another in such a way that the beam bundle is focused a second time in the interaction volume in the workpiece 14 and strikes the first resonator mirror 13 as a narrow beam bundle after the second partial absorption. When the focal length is selected in such a way that the reflected beam is again collected exactly in the third focus point 20 after the third passage through the workpiece 14, the condition for a genuine resonator function, i.e., that the beam passes back and forth frequently between the two resonator mirrors 13 and 19, is met. As a result of the absorption taking place during every passage through the workpiece, the bundle finally "dies out" and the available radiation output is deposited substantially in the material to be machined, even with weak absorption.

A very substantial second advantage consists in that beam components are completely prevented from running back into the radiation source 6, so that special measures for decoupling the radiation source 6 can be omitted in this preferred construction of the arrangement according to the invention.

Figure 7:
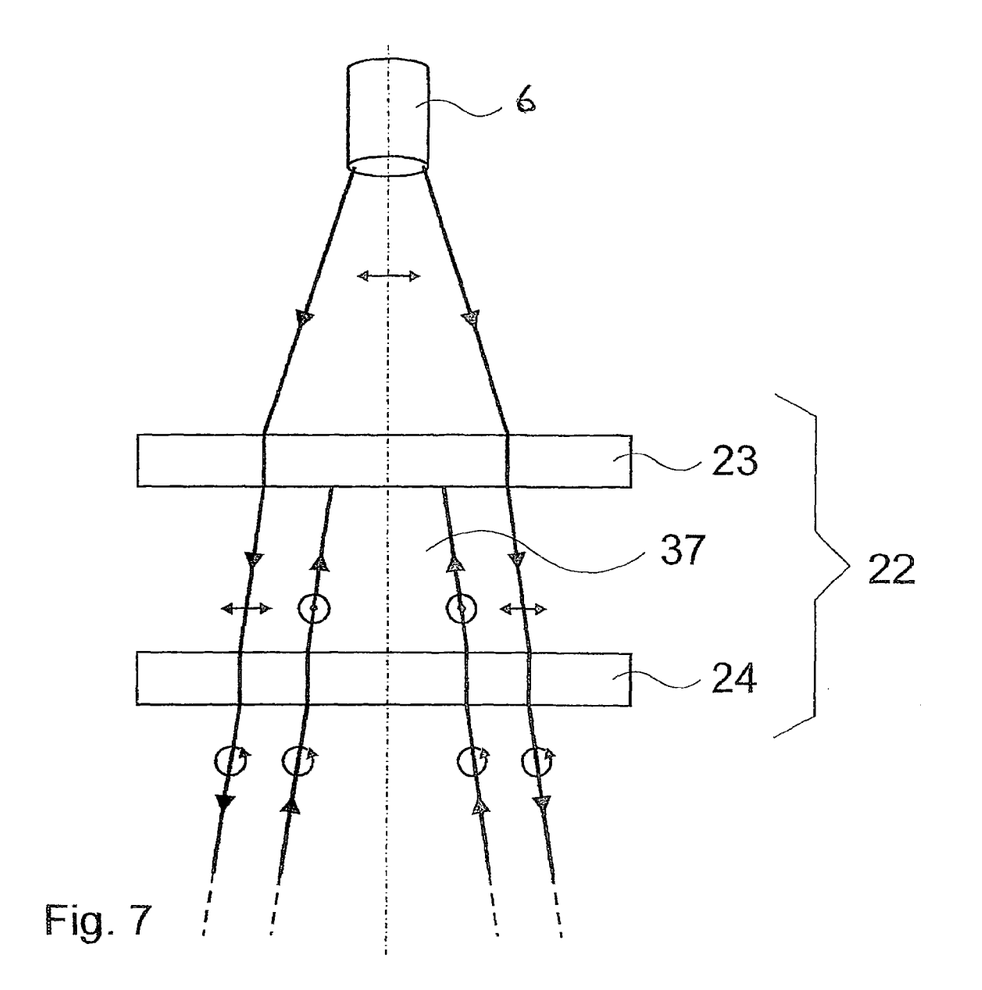
FIG. 7 shows a decoupling unit.

In a second embodiment example for an arrangement according to the invention, the beam bundle is focused in the interaction volume during every passage through the workpiece 14 in order to reduce the interaction volume and introduce the energy in a more concentrated manner spatially. For this purpose, the focal length of the first resonator mirror 13 must be selected in such a way that the beam bundle is not focused in the third focus point 20, but rather a third time in the workpiece 14 in the second focus point. However, this advantage is gained at a cost in that the residual radiation that is not absorbed runs back in the direction of the radiation source 6 (fourth focused passage through the workpiece 14), since the basic condition for the resonator function is no longer met. Accordingly, in this case a special decoupling unit 22 must be placed behind the radiation source 6 in the radiation direction as is shown, for example, in FIG. 7.

The beam decoupling unit 22 shown herein requires that the radiation source 6 transmits linearly polarized electromagnetic radiation, which applies for most lasers. In the illustration shown in FIG. 7, it is assumed that its polarization plane lies in the drawing plane. This radiation passes through the polarizer 23, which is adjusted for passing, without substantial losses and subsequently impinges on the quarter-wave plate 24 arranged directly behind the polarizer 23. This influences the polarization in such a way that a circularly polarized beam bundle running in the direction of the continuing beam path results from the originally linearly polarized beam bundle. The beam bundle returning after passing repeatedly through the workpiece 14 still has substantially the same polarization characteristics, i.e., it is also still circularly polarized. When this beam bundle strikes the quarter-wave plate 24 in the opposite direction of travel, the polarization state is changed in such a way that the circularly polarized beam becomes linearly polarized again, but with a polarization plane that is rotated by 90° relative to the original beam bundle. However, for radiation that is polarized perpendicular to the drawing plane, the polarizer 23 lies in the blocking direction, so that this radiation is prevented from passing and cannot be coupled into the radiation source 6.

Figure 8:
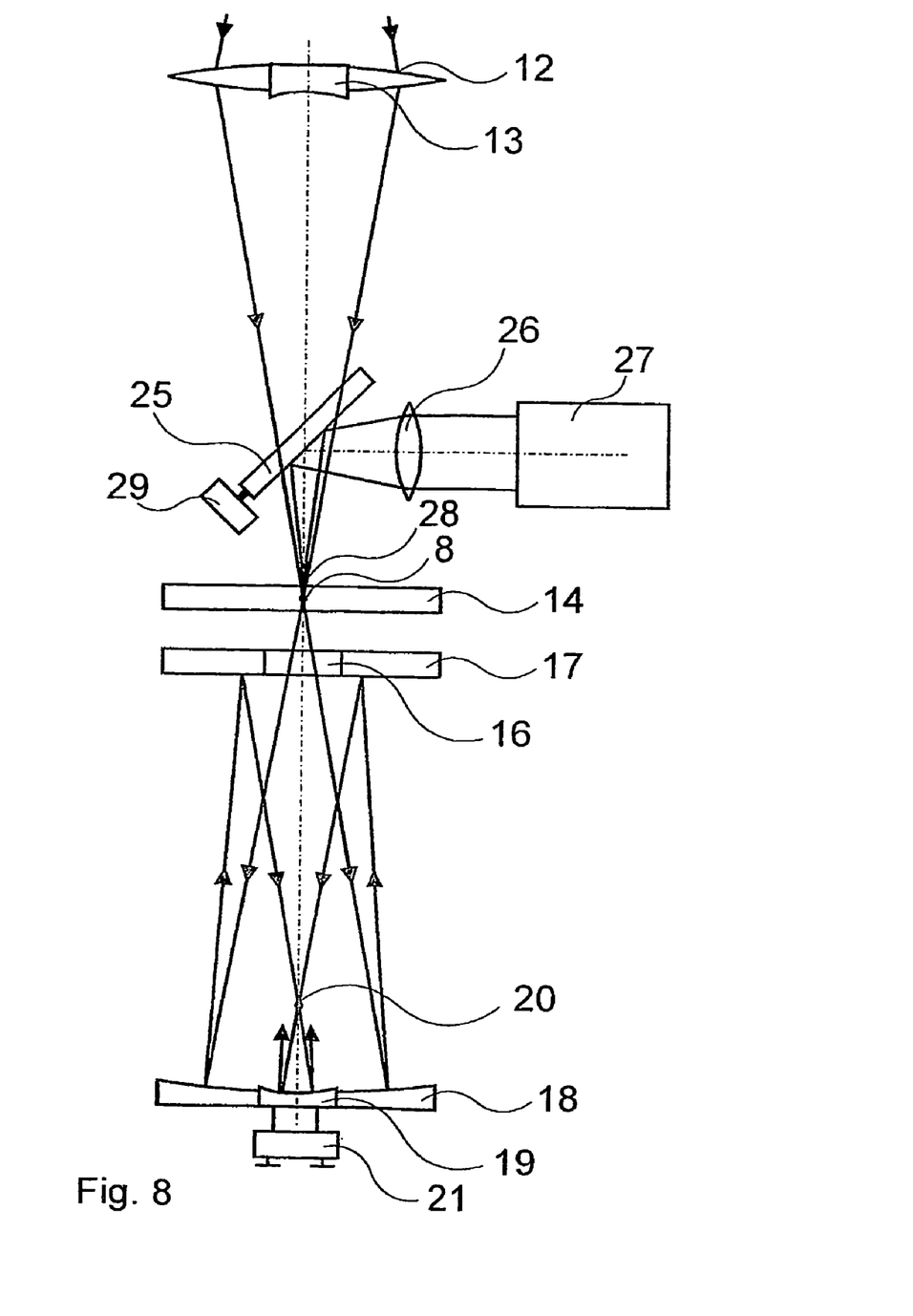
FIG. 8 shows a resonator unit with an additional radiation source for generating starting cracks.

A third embodiment example will be described in more detail with reference to FIG. 8. In contrast to the first embodiment example shown in FIG. 6, a deflecting unit 25 is introduced between the collecting lens 12 and the workpiece 14. The radiation from an additional radiation source 27 which is focused by a lens 26 is coupled into the beam path of the total arrangement by means of this deflecting unit 25. This additional radiation is provided for generating a starting crack when severing glass. The additional radiation source 27 is preferably a TEA-$CO_2$ laser whose pulsed radiation, with a high pulse output and high pulse energy, is sharply focused on the workpiece 14 by the lens 26. The deflecting unit 25 ensures that this additional focus 28 lies exactly at the desired location relative to the position of the interaction volume. In order to adjust any desired positions for the additional focus 28, the deflecting unit 25 is coupled with an adjusting device 29. The deflecting unit 25 can advantageously comprise a plane-parallel plate which is coated in such a way that it is completely transparent for the wavelength of the incident electromagnetic radiation of the radiation source 6 and fully reflects the beam of the additional radiation source 27.

The deflecting unit 25 can also be a simple mirror 17 for the beam of the additional radiation source 27 and is slid into or folded into the beam path for generating a starting crack and removed again from the beam path prior to the actual machining of the workpiece 14 which, in this case where a starting crack is generated, involves severing.

While the foregoing description and drawings represent the present invention, it will be obvious to those skilled in the art that various changes may be made herein without departing from the true spirit and scope of the present invention.

REFERENCE NUMBERS

1 first axicon
2 focusing lens
3 second axicon
4 beam-shaping unit
5 resonator unit
6 radiation source
8 first focus point
9 optical axis
10 beam ring
12 collecting lens
13 first resonator mirror
14 workpiece
15 second focus point
16 hole
17 mirror
18 focusing mirror
19 second resonator mirror
20 third focus point
21 adjusting unit
22 beam decoupling unit
23 polarizer
24 quarter-wave plate
25 deflecting unit
26 lens
27 additional radiation source
28 additional focus
29 adjusting device
$\delta 1$ cone angle of the first axicon
$\delta 2$ cone angle of the second axicon
a distance

What is claimed is:

1. An arrangement for introducing radiation energy into a workpiece made from a weakly absorbent material comprising:

a radiation source and a resonator unit, wherein the resonator unit comprises a first resonator mirror and a second resonator mirror between which the workpiece is fixed;

a beam-shaping unit shaping a ring-shaped beam bundle which has a central radiationless area and arranged in front of the resonator unit and the first resonator mirror being located in a radiationless central area behind a first focus point;

a collecting lens being provided which surrounds the first resonator mirror and which focuses an incident beam bundle in the workpiece in a second focus point;

said second resonator mirror being located in the radiationless central area behind the second focus point and surrounded by a focusing mirror which shapes a divergent beam bundle coming from the second focus point into a convergent beam bundle and reflects it onto a mirror that is arranged between the focusing mirror and the workpiece and reflects the beam bundle onto the second resonator mirror;

said mirror having a hole that is just large enough to allow the beam bundle coming from the second focus point and traveling in the direction of the focusing mirror to pass through without being influenced and through which the beam bundle reflected by the second resonator mirror passes without being influenced and being focused a second time inside the workpiece in a second focus point before subsequently striking the first resonator mirror and being reflected back by the first resonator mirror into the workpiece.

2. An arrangement according to claim 1 wherein the parameters of the second resonator mirror and of the focusing mirror are selected in such a way that the beam bundle reflected by the focusing mirror is focused in the second focus point selectively with or without intermediate focusing a second time after reflection at the second resonator mirror, a third time after reflection at the first resonator mirror, and a fourth time after a repeated reflection at the second resonator mirror, and a beam decoupling unit is arranged in front between the radiation source and the beam-shaping unit and prevents beam components from being coupled back to the radiation source.

3. An arrangement according to claim 1, wherein an additional radiation source is provided for generating a starting crack and the additional beam of this additional radiation source can be focused occasionally in the workpiece by a lens and a deflecting unit.

4. An arrangement according to claim 1, wherein the beam shaping unit comprises:
a focusing lens followed by a first axicon which is arranged with the focusing lens on a common optical axis and whose conical optical surface faces the focusing lens;
a second axicon being arranged on the optical axis in front of the focusing lens with its conical optical surface remote of the focusing lens and the parameters of the focusing lens and of the axicons, and their distances from one another being selected in such a way that a beam bundle coming from a radiation source arranged on the optical axis in front of the second axicon and passing through the beam-shaping unit is shaped into a ring-shaped beam bundle which is focused in a first focus point and which subsequently diverges and which has a central radiationless area.

5. An arrangement according to claim 1, wherein the parameters of the second resonator mirror and of the focusing mirror are selected in such a way that, before striking the second resonator mirror, the beam bundle reflected by the focusing mirror is focused in a third focus point that is imaged in the second focus point by the second resonator mirror, and in that the parameters of the first resonator mirror are selected in such a way that a beam bundle coming from the second focus point and impinging on the first resonator mirror is focused in the third focus point.

6. An arrangement according to claim 5, wherein the radiation source emits linearly polarized light and the beam decoupling unit is formed by a polarizer and a quarter-wave plate.

* * * * *